(12) United States Patent
Ferraiolo et al.

(10) Patent No.: US 7,478,259 B2
(45) Date of Patent: Jan. 13, 2009

(54) SYSTEM, METHOD AND STORAGE MEDIUM FOR DERIVING CLOCKS IN A MEMORY SYSTEM

(75) Inventors: Frank D. Ferraiolo, New Windsor, NY (US); Kevin C. Gower, LaGrangeville, NY (US); Martin L. Schmatz, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 460 days.

(21) Appl. No.: 11/263,344

(22) Filed: Oct. 31, 2005

(65) Prior Publication Data

US 2007/0101086 A1    May 3, 2007

(51) Int. Cl.
*G06F 1/00* (2006.01)
(52) U.S. Cl. ...................................... 713/501; 713/500
(58) Field of Classification Search ................. 713/500, 713/501
See application file for complete search history.

(56) References Cited

U.S. PATENT DOCUMENTS

| | | | |
|---|---|---|---|
| 2,842,682 A | 7/1958 | Clapper | |
| 3,333,253 A | 7/1967 | Sahulka | |
| 3,395,400 A | 7/1968 | De Witt | |
| 3,825,904 A | 7/1974 | Burk et al. | |
| 4,028,675 A | 6/1977 | Frankenburg | 711/106 |
| 4,135,240 A | 1/1979 | Ritchie | |
| 4,472,780 A | 9/1984 | Chenoweth et al. | |
| 4,475,194 A | 10/1984 | LaVallee et al. | 371/10 |
| 4,486,739 A | 12/1984 | Franaszek et al. | 340/347 DD |
| 4,641,263 A | 2/1987 | Perlman et al. | |
| 4,654,857 A | 3/1987 | Samson et al. | |
| 4,723,120 A | 2/1988 | Petty, Jr. | 340/825.02 |
| 4,740,916 A | 4/1988 | Martin | 364/900 |
| 4,796,231 A | 1/1989 | Pinkham | 385/189.05 |

(Continued)

FOREIGN PATENT DOCUMENTS

EP    0470734 A1    2/1992

(Continued)

OTHER PUBLICATIONS

Sivencrona et al.; "RedCAN™: Simulations of two Fault Recovery Algorithms for CAN;" Proceedings for the 10th IEEE Pacific Rim International Symposium on Dependable Computing (PRDC'04); 2005.

(Continued)

*Primary Examiner*—Thomas Lee
*Assistant Examiner*—Ji H Bae
(74) *Attorney, Agent, or Firm*—Cantor Colburn LLP; Lynn Augspurger

(57) ABSTRACT

A system, method and storage medium for deriving clocks in a memory system. The method includes receiving a reference oscillator clock at a hub device. The hub device is in communication with a controller channel via a controller interface and in communication with a memory device via a memory interface. A base clock operating at a base clock frequency is derived from the reference oscillator clock. A memory interface clock is derived by multiplying the base clock by a memory multiplier. A controller interface clock is derived by multiplying the base clock by a controller multiplier. The memory interface clock is applied to the memory interface and the controller interface clock is applied to the controller interface.

15 Claims, 5 Drawing Sheets

U.S. PATENT DOCUMENTS

| | | | |
|---|---|---|---|
| 4,803,485 A | 2/1989 | Rypinski | 370/452 |
| 4,833,605 A | 5/1989 | Terada et al. | 364/200 |
| 4,839,534 A | 6/1989 | Clasen | 307/269 |
| 4,943,984 A | 7/1990 | Pechanek et al. | 375/109 |
| 4,985,828 A | 1/1991 | Shimizu et al. | |
| 5,053,947 A | 10/1991 | Heibel et al. | 364/200 |
| 5,177,375 A | 1/1993 | Ogawa et al. | |
| 5,206,946 A | 4/1993 | Brunk | 710/2 |
| 5,214,747 A | 5/1993 | Cok | 395/27 |
| 5,265,049 A | 11/1993 | Takasugi | |
| 5,265,212 A | 11/1993 | Bruce, II | 710/113 |
| 5,287,531 A | 2/1994 | Rogers, Jr. et al. | 395/800 |
| 5,347,270 A | 9/1994 | Matsuda et al. | 340/2.21 |
| 5,357,621 A | 10/1994 | Cox | |
| 5,375,127 A | 12/1994 | Leak | |
| 5,387,911 A | 2/1995 | Gleichert et al. | 341/95 |
| 5,394,535 A | 2/1995 | Ohuchi | 711/155 |
| 5,454,091 A | 9/1995 | Sites et al. | |
| 5,475,690 A | 12/1995 | Burns et al. | 370/105.3 |
| 5,513,135 A | 4/1996 | Dell et al. | |
| 5,517,626 A | 5/1996 | Archer et al. | |
| 5,522,064 A * | 5/1996 | Aldereguia et al. | 713/501 |
| 5,544,309 A | 8/1996 | Chang et al. | |
| 5,546,023 A | 8/1996 | Borkar et al. | |
| 5,561,826 A | 10/1996 | Davies et al. | |
| 5,592,632 A | 1/1997 | Leung et al. | 395/306 |
| 5,594,925 A | 1/1997 | Harder et al. | |
| 5,611,055 A | 3/1997 | Krishan et al. | 395/281 |
| 5,613,077 A | 3/1997 | Leung et al. | 395/306 |
| 5,627,963 A | 5/1997 | Gabillard et al. | 714/42 |
| 5,661,677 A | 8/1997 | Rondeau, II et al. | |
| 5,666,480 A | 9/1997 | Leung et al. | 395/180 |
| 5,684,418 A * | 11/1997 | Yanagiuchi | 327/99 |
| 5,706,346 A | 1/1998 | Katta et al. | |
| 5,764,155 A | 6/1998 | Kertesz et al. | 340/825.08 |
| 5,822,749 A | 10/1998 | Agarwal | |
| 5,852,617 A | 12/1998 | Mote, Jr. | 714/726 |
| 5,870,325 A | 2/1999 | Nielsen et al. | 365/63 |
| 5,872,996 A | 2/1999 | Barth et al. | 395/853 |
| 5,917,760 A | 6/1999 | Millar | |
| 5,926,838 A | 7/1999 | Jeddeloh | 711/167 |
| 5,928,343 A | 7/1999 | Farmwald et al. | 710/104 |
| 5,930,273 A | 7/1999 | Mukojima | 714/776 |
| 5,959,914 A | 9/1999 | Gates et al. | |
| 5,973,951 A | 10/1999 | Bechtolsheim et al. | 365/52 |
| 5,974,493 A | 10/1999 | Okumura et al. | 710/307 |
| 5,995,405 A | 11/1999 | Trick | 365/63 |
| 6,003,121 A | 12/1999 | Wirt | |
| 6,011,732 A | 1/2000 | Harrison et al. | |
| 6,038,132 A | 3/2000 | Tokunaga et al. | 361/760 |
| 6,049,476 A | 4/2000 | Laudon et al. | 365/52 |
| 6,076,158 A | 6/2000 | Sites et al. | |
| 6,078,515 A | 6/2000 | Nielsen et al. | 365/63 |
| 6,081,868 A | 6/2000 | Brooks | |
| 6,085,276 A | 7/2000 | VanDoren et al. | |
| 6,096,091 A | 8/2000 | Hartmann | 716/17 |
| 6,128,746 A | 10/2000 | Clark et al. | 713/324 |
| 6,145,028 A | 11/2000 | Shank et al. | |
| 6,170,047 B1 | 1/2001 | Dye | |
| 6,170,059 B1 | 1/2001 | Pruett et al. | |
| 6,185,718 B1 | 2/2001 | Dell et al. | |
| 6,215,686 B1 | 4/2001 | Deneroff et al. | 365/52 |
| 6,219,288 B1 | 4/2001 | Braceras et al. | |
| 6,219,760 B1 | 4/2001 | McMinn | |
| 6,260,127 B1 | 7/2001 | Olarig et al. | 711/167 |
| 6,262,493 B1 | 7/2001 | Garnett | |
| 6,292,903 B1 | 9/2001 | Coteus et al. | 713/401 |
| 6,301,636 B1 | 10/2001 | Schultz et al. | 711/108 |
| 6,317,352 B1 | 11/2001 | Halbert et al. | 365/52 |
| 6,321,343 B1 | 11/2001 | Toda | 713/600 |
| 6,338,113 B1 | 1/2002 | Kubo et al. | 711/105 |
| 6,357,018 B1 | 3/2002 | Stuewe et al. | |
| 6,370,631 B1 | 4/2002 | Dye | |
| 6,378,018 B1 | 4/2002 | Tsern et al. | 710/129 |
| 6,381,685 B2 | 4/2002 | Dell et al. | |
| 6,393,528 B1 | 5/2002 | Arimilli et al. | |
| 6,408,398 B1 | 6/2002 | Frecker et al. | |
| 6,446,174 B1 | 9/2002 | Dow | |
| 6,467,013 B1 | 10/2002 | Nizar | |
| 6,473,836 B1 | 10/2002 | Ikeda | |
| 6,477,614 B1 * | 11/2002 | Leddige et al. | 711/5 |
| 6,483,755 B2 | 11/2002 | Leung et al. | 365/189.05 |
| 6,484,271 B1 | 11/2002 | Gray | |
| 6,487,102 B1 | 11/2002 | Halbert et al. | |
| 6,487,627 B1 | 11/2002 | Willke et al. | 710/306 |
| 6,493,250 B2 | 12/2002 | Halbert et al. | 365/63 |
| 6,496,540 B1 | 12/2002 | Windmer | 375/242 |
| 6,496,910 B1 | 12/2002 | Baentsch et al. | |
| 6,499,070 B1 | 12/2002 | Whetsel | |
| 6,502,161 B1 | 12/2002 | Perego et al. | 711/5 |
| 6,507,888 B2 | 1/2003 | Wu et al. | 711/105 |
| 6,510,100 B2 | 1/2003 | Grundon et al. | 365/233 |
| 6,513,091 B1 | 1/2003 | Blackmon et al. | 710/316 |
| 6,532,525 B1 | 3/2003 | Aleksic et al. | 711/168 |
| 6,546,359 B1 | 4/2003 | Week | 702/186 |
| 6,549,971 B1 | 4/2003 | Cecchi et al. | 710/306 |
| 6,553,450 B1 | 4/2003 | Dodd et al. | 711/105 |
| 6,557,069 B1 | 4/2003 | Drehmel et al. | 710/307 |
| 6,564,329 B1 | 5/2003 | Cheung et al. | |
| 6,584,576 B1 | 6/2003 | Co | |
| 6,587,912 B2 | 7/2003 | Leddige et al. | |
| 6,590,827 B2 * | 7/2003 | Chang et al. | 365/233.1 |
| 6,594,748 B1 | 7/2003 | Lin | |
| 6,601,121 B2 | 7/2003 | Singh et al. | 710/112 |
| 6,601,149 B1 | 7/2003 | Brock et al. | |
| 6,604,180 B2 | 8/2003 | Jeddeloh | |
| 6,611,905 B1 | 8/2003 | Grundon et al. | 711/167 |
| 6,622,217 B2 | 9/2003 | Gharachorloo et al. | 711/141 |
| 6,625,687 B1 | 9/2003 | Halbert et al. | 711/105 |
| 6,625,702 B2 | 9/2003 | Rentschler et al. | |
| 6,628,538 B2 | 9/2003 | Funaba et al. | 365/63 |
| 6,631,439 B2 | 10/2003 | Saulsbury et al. | |
| 6,671,376 B1 | 12/2003 | Koto et al. | 380/210 |
| 6,678,811 B2 | 1/2004 | Rentschler et al. | 711/167 |
| 6,684,320 B2 | 1/2004 | Mohamed et al. | |
| 6,697,919 B2 | 2/2004 | Gharachorloo et al. | 711/141 |
| 6,704,842 B1 | 3/2004 | Janakiraman et al. | |
| 6,721,185 B2 | 4/2004 | Dong et al. | |
| 6,721,944 B2 | 4/2004 | Chaudhry et al. | |
| 6,738,836 B1 | 5/2004 | Kessler et al. | |
| 6,741,096 B2 | 5/2004 | Moss | |
| 6,754,762 B1 | 6/2004 | Curley | |
| 6,766,389 B2 | 7/2004 | Hayter et al. | |
| 6,775,747 B2 | 8/2004 | Venkatraman | |
| 6,791,555 B1 | 9/2004 | Radke et al. | |
| 6,792,495 B1 | 9/2004 | Garney et al. | |
| 6,839,393 B1 | 1/2005 | Sidiropoulos | 375/371 |
| 6,877,076 B1 | 4/2005 | Cho et al. | |
| 6,877,078 B2 | 4/2005 | Fujiwara et al. | |
| 6,882,082 B2 * | 4/2005 | Greeff et al. | 310/307 |
| 6,889,284 B1 | 5/2005 | Nizar et al. | |
| 6,898,726 B1 | 5/2005 | Lee | |
| 6,918,068 B2 | 7/2005 | Vail et al. | |
| 6,938,119 B2 | 8/2005 | Kohn et al. | |
| 6,944,084 B2 | 9/2005 | Wilcox | |
| 6,948,091 B2 | 9/2005 | Bartels et al. | |
| 6,949,950 B2 | 9/2005 | Takahaski et al. | |
| 6,977,536 B2 | 12/2005 | Chin-Chich et al. | 327/116 |
| 6,993,612 B2 | 1/2006 | Porterfield | |
| 7,039,755 B1 | 5/2006 | Helms | |
| 7,047,384 B2 | 5/2006 | Bodas et al. | |
| 7,076,700 B2 | 7/2006 | Rieger | |
| 7,103,792 B2 | 9/2006 | Moon | |
| 7,133,790 B2 | 11/2006 | Liou | |

| | | |
|---|---|---|
| 7,133,972 B2 | 11/2006 | Jeddeloh |
| 7,162,567 B2 * | 1/2007 | Jeddeloh ............... 711/5 |
| 7,177,211 B2 | 2/2007 | Zimmerman |
| 7,194,593 B2 | 3/2007 | Schnepper |
| 7,197,594 B2 | 3/2007 | Raz et al. |
| 7,206,962 B2 | 4/2007 | Deegan |
| 7,216,196 B2 | 5/2007 | Jeddeloh |
| 7,227,949 B2 | 6/2007 | Heegard et al. |
| 7,240,145 B2 | 7/2007 | Holman |
| 7,266,634 B2 | 9/2007 | Ware et al. |
| 7,313,583 B2 | 12/2007 | Porten et al. |
| 7,321,979 B2 * | 1/2008 | Lee ............... 713/600 |
| 2001/0000822 A1 | 5/2001 | Dell et al. ............ 711/170 |
| 2001/0003839 A1 | 6/2001 | Kondo |
| 2001/0029566 A1 | 10/2001 | Woo |
| 2002/0002662 A1 * | 1/2002 | Olarig et al. ............ 711/167 |
| 2002/0019926 A1 | 2/2002 | Huppenthal et al. ......... 712/15 |
| 2002/0038405 A1 | 3/2002 | Leddige, et al. |
| 2002/0059439 A1 | 5/2002 | Arroyo et al. |
| 2002/0083255 A1 | 6/2002 | Greeff et al. ............ 710/305 |
| 2002/0103988 A1 | 8/2002 | Dornier |
| 2002/0112119 A1 | 8/2002 | Halbert et al. |
| 2002/0112194 A1 | 8/2002 | Uzelac ............... 713/500 |
| 2002/0124195 A1 | 9/2002 | Nizar |
| 2002/0124201 A1 | 9/2002 | Edwards et al. |
| 2002/0147898 A1 | 10/2002 | Rentschler et al. |
| 2002/0174274 A1 | 11/2002 | Wu et al. |
| 2003/0009632 A1 | 1/2003 | Arimilli et al. |
| 2003/0028701 A1 | 2/2003 | Rao et al. |
| 2003/0033364 A1 | 2/2003 | Garnett et al. ............ 709/203 |
| 2003/0051055 A1 | 3/2003 | Parrella et al. |
| 2003/0056183 A1 | 3/2003 | Kobayahi |
| 2003/0084309 A1 | 5/2003 | Kohn ............... 713/189 |
| 2003/0090879 A1 | 5/2003 | Doblar et al. ............ 361/728 |
| 2003/0105938 A1 | 6/2003 | Cooksey et al. |
| 2003/0126363 A1 | 7/2003 | David |
| 2003/0223303 A1 | 12/2003 | Lamb et al. ............ 365/230.06 |
| 2003/0236959 A1 | 12/2003 | Johnson et al. ............ 711/167 |
| 2004/0006674 A1 | 1/2004 | Hargis et al. ............ 711/156 |
| 2004/0049723 A1 | 3/2004 | Obara ............... 714/729 |
| 2004/0098549 A1 | 5/2004 | Dorst |
| 2004/0117588 A1 | 6/2004 | Arimilli et al. |
| 2004/0128474 A1 | 7/2004 | Vorbach ............... 712/10 |
| 2004/0163028 A1 | 8/2004 | Olarig |
| 2004/0165609 A1 | 8/2004 | Herbst et al. |
| 2004/0199363 A1 | 10/2004 | Bohizic et al. |
| 2004/0205433 A1 | 10/2004 | Gower et al. |
| 2004/0230718 A1 | 11/2004 | Polzin et al. |
| 2004/0246767 A1 | 12/2004 | Vogt ............... 365/154 |
| 2004/0250153 A1 | 12/2004 | Vogt ............... 713/500 |
| 2004/0260909 A1 | 12/2004 | Lee et al. |
| 2004/0260957 A1 | 12/2004 | Jeddeloh et al. |
| 2005/0023560 A1 | 2/2005 | Ahn et al. ............... 257/200 |
| 2005/0033906 A1 | 2/2005 | Mastronarde et al. |
| 2005/0044305 A1 | 2/2005 | Jakobs et al. |
| 2005/0044457 A1 | 2/2005 | Jeddeloh |
| 2005/0050237 A1 | 3/2005 | Jeddeloh |
| 2005/0050255 A1 | 3/2005 | Jeddeloh |
| 2005/0066136 A1 | 3/2005 | Schnepper |
| 2005/0071542 A1 | 3/2005 | Weber et al. |
| 2005/0080581 A1 | 4/2005 | Zimmerman et al. |
| 2005/0086441 A1 | 4/2005 | Myer et al. |
| 2005/0097249 A1 | 5/2005 | Oberlin et al. |
| 2005/0120157 A1 | 6/2005 | Chen et al. ............ 710/313 |
| 2005/0125702 A1 | 6/2005 | Huang et al. |
| 2005/0125703 A1 | 6/2005 | Lefurgy et al. |
| 2005/0138246 A1 | 6/2005 | Chen et al. |
| 2005/0138267 A1 | 6/2005 | Bains et al. |
| 2005/0144399 A1 | 6/2005 | Hosomi |
| 2005/0149665 A1 | 7/2005 | Wolrich et al. |
| 2005/0166006 A1 | 7/2005 | Talbot et al. |
| 2005/0177677 A1 | 8/2005 | Jeddeloh |
| 2005/0177690 A1 | 8/2005 | LaBerge |
| 2005/0204216 A1 | 9/2005 | Daily et al. ............ 714/724 |
| 2005/0223196 A1 | 10/2005 | Knowles |
| 2005/0229132 A1 | 10/2005 | Butt et al. ............ 716/10 |
| 2005/0248997 A1 | 11/2005 | Lee |
| 2005/0257005 A1 | 11/2005 | Jeddeloh |
| 2005/0259496 A1 | 11/2005 | Hsu et al. |
| 2005/0289377 A1 | 12/2005 | Luong |
| 2006/0036826 A1 | 2/2006 | Dell et al. |
| 2006/0036827 A1 | 2/2006 | Dell et al. |
| 2006/0080584 A1 | 4/2006 | Hartnett et al. |
| 2006/0085602 A1 | 4/2006 | Huggahalli et al. |
| 2006/0095592 A1 | 5/2006 | Borkenhagen |
| 2006/0095679 A1 | 5/2006 | Edirisooriya |
| 2006/0107175 A1 | 5/2006 | Dell et al. |
| 2006/0112238 A1 | 5/2006 | Jamil et al. |
| 2006/0161733 A1 | 7/2006 | Beckett et al. |
| 2006/0195631 A1 | 8/2006 | Rajamani |
| 2006/0288172 A1 | 12/2006 | Lee et al. |
| 2007/0025304 A1 | 2/2007 | Leelahakriengkrai et al. |
| 2007/0160053 A1 | 7/2007 | Coteus |

FOREIGN PATENT DOCUMENTS

| | | |
|---|---|---|
| GB | 2396711 A | 6/2004 |
| JP | 59153353 A | 9/1984 |
| JP | 04326140 A | 11/1992 |
| JP | 10011971 | 1/1998 |
| WO | WO2005038660 | 4/2005 |

OTHER PUBLICATIONS

Jungjoon Kim et al.; "Performance and Architecture Features of Segmented Multiple Bus System;" IEEE Computer Society; 1999 International Conference on Parallel Processing (ICPP '99).

Ghoneima et al.; "Optimum Positioning of Interleaved Reapeaters in Bidirectional Buses;" IEEE Transactions on Computer-Aided Design of Integrated Ciruicts and Systems, vol. 25, No. 3, Mar. 2005, pp. 461-469.

Seceleanu et al.; "Segment Arbiter as Action System;" IEEE 2003 pp. 249-252.

PCT International Search Report PCT/EP2006/068984. Mailed Feb. 16, 2007.

PCT International Search Report PCT/EP2007/057916. Mailed Dec. 14, 2007.

Benini, Luca, et al. "System-Level Power Optimization: Techniques and Tools", ACM Transactions on Design Automation of Electronic Systems, vol. 6, No. 2, Apr. 2001, pp. 149-206.

Boudon, et al., "Novel Bus Reconfiguration Scheme With Spare Lines", IBM Technical Disclosure Bulletin, May 1987, vol. 29, No. 12, pp. 1-3.

Massoud Pedram, "Power Minimization in IC Design Principles and Applications", ACM Transactions on Design Automation of Electronic Systems vol. 1, No. 1, Jan. 1996, pp. 3-56.

NB940259 (IBM Technical Disclosure Bulletin, Feb. 1994; vol. 37; pp. 59-64).

P.R. Panda, "Data and Memory Optimization Techniques For Embedded Systems", ACM Transactions on Design Automation of Electronic Systems, vol. 6, No. 2, Apr. 2001, pp. 149-206.

Singh, S., et al., "Bus Sparing for Fault-Tolerant System Design", IBM Technical Disclosure Bulletin, Dec. 1991, vol. 34, No. 71, pp. 117-118.

U.S. Appl. No. 11/419,586, filed May 22, 2006. Robert Tremaine. "Systems and Methods for Providing Remote Pre-Fetch Buffers".

Understanding System Memory and CPU Speeds: A Layman's Guide to the Front Side Bus (FSB), [online]; [retrieved on Feb. 23, 2006]; retrieved from the Internet http://www.directron.com/fsbguide.html.

JEDEC Solid State Technology Association, "JEDEC Standard: DDR2 SDRAM Specification", Jan. 2004, JEDEC, Revision JESD79-2A, p. 10.

Brown, et al "Compiler-Based I/O Prefetching for Out-of-Core Applications", ACM Transactions on Computer Systems, vol. 19, No. 2, May 2001, pp. 111-170.

Wang, et al "Guided Region Prefetching: A Cooperative Hardware/Software Approach", pp. 388-398.

Natarajan, et al "A Study of Performance Impact of Memory Controller Features in Multi-Processor Server Environment", pp. 80-87.

Nilsen, "High-Level Dynamic Memory Management for Object-Oriented Real-Time Systems", pp. 86-93.

Wikipedia, Serial Communications, [online], [retrieved Apr. 10, 2007 from the Internet], http://en.wikipedia.org/wiki/Serial_communications, 3 pages.

IEEE, "IEEE Standard Test Access Port and Boundary-Scan Architecture", Jul. 23, 2001, IEEE Std 1149-1-2001, pp. 11-13.

Rosenberg, "Dictionary of Computers, Information Processing & Telecommuications", Second Edition, John Wiley & Sons, Inc. 1987. 3 pgs.

PCT Search Report. PCT/EP2007/057915. Mailed Nov. 7, 2007.

International Search Report, International Application No. PCT/EP2007/054929, International Publication No. WO 2007/135144 A1, received Mar. 21, 2008.

* cited by examiner

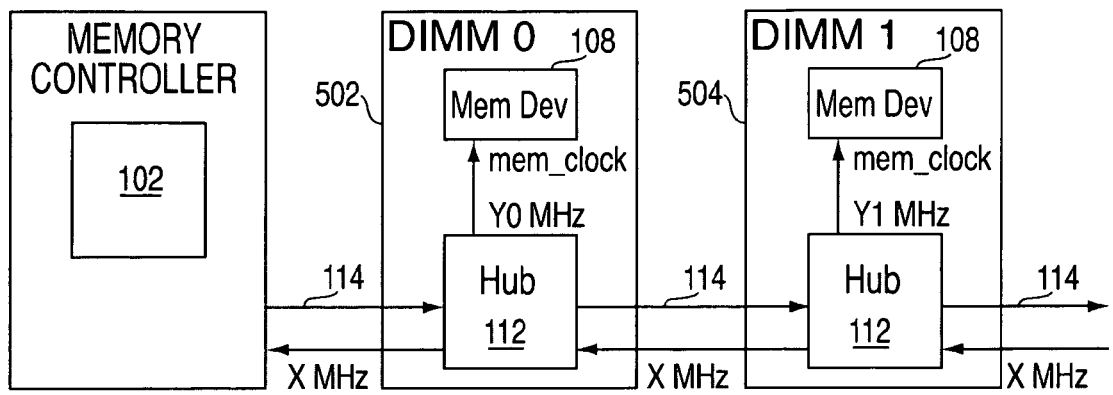
FIG. 5
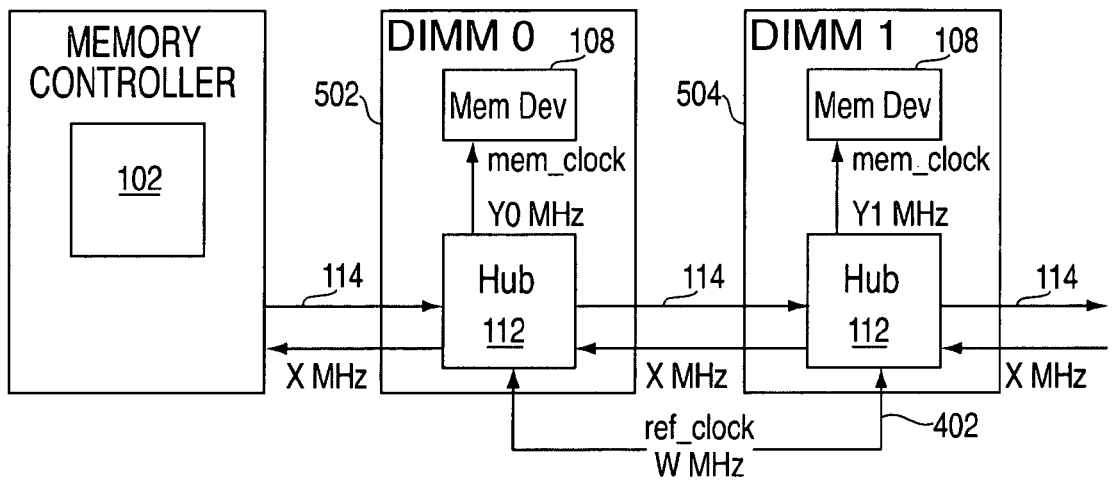
FIG. 6
| m | n | 3 | 4 | 5 | 6 | 8 | 10 | 12 |
|---|---|---|---|---|---|---|---|---|
| | 2Y 2X (Mbps) | 800 | 1067 | 1333 | 1600 | 2133 | 2667 | 3200 |
| 12 | 3200 | 4:1 * | 3:1 * | 12:5 | 2:1 | 3:2 | 6:5 | 1:1 |
| 14 | 3733 | 14:3 | 7:2 | 14:5 | 7:3 | 7:4 | 7:5 | 7:6 |
| 16 | 4267 | 16:3 | 4:1 * | 16:5 | 8:3 | 2:1 | 8:5 | 4:3 |
| 18 | 4800 | 6:1 * | 9:2 | 18:5 | 3:1 * | 9:4 | 9:5 | 3:2 |
| 20 | 5333 | 20:3 | 5:1 | 4:1 * | 10:3 | 5:2 | 2:1 | 5:3 |
| 22 | 5867 | 22:3 | 11:2 | 22:5 | 11:3 | 11:4 | 11:5 | 11:6 |
| 24 | 6400 | 8:1 | 6:1 * | 24:5 | 4:1 * | 3:1 * | 12:5 | 2:1 |
| 26 | 6933 | 26:3 | 13:2 | 26:5 | 13:3 | 13:4 | 13:5 | 13:6 |
| 28 | 7466 | 28:3 | 7:1 | 28:5 | 14:3 | 7:2 | 14:5 | 7:3 |
| 30 | 8000 | 10:1 | 15:2 | 6:1 * | 5:1 | 15:4 | 3:1 * | 5:2 |
| 32 | 8533 | 32:3 | 8:1 | 32:5 | 16:3 | 4:1 * | 16:5 | 8:3 |
| 34 | 9066 | 34:3 | 17:2 | 34:5 | 17:3 | 17:4 | 17:5 | 17:6 |
| 36 | 9600 | 12:1 | 9:1 | 36:5 | 6:1 * | 9:2 | 18:5 | 3:1* |
FIG. 7

SYSTEM, METHOD AND STORAGE MEDIUM FOR DERIVING CLOCKS IN A MEMORY SYSTEM

BACKGROUND OF THE INVENTION

This invention relates to memory systems comprised of hub devices connected to a memory controller by a daisy chained controller channel. The hub devices are attached to or reside upon memory modules that contain memory devices. More particularly, this invention relates to allowing the memory devices on the same controller channel to operate at varying frequencies.

Most high performance computing main memory systems use multiple memory modules with multiple memory devices connected to a controller by one or more controller channels. All memory modules connected to the same controller channel operate at the same controller frequency and all of their memory devices operate at the same frequency. The ratio of the controller channel frequency to the memory device clock frequency is typically a fixed integer. These restrictions limit the memory device operating frequencies when mixed within a channel. Due to the fixed ratio of channel frequency to memory device frequency, channels that are not able to attain the highest data rate will operate with a decrease in both channel and memory device frequency. These typical main memory systems must operate no faster than the slowest memory module on the channel. When a channel is populated with a memory module that is slower than the others, the entire channel, and perhaps the entire memory system, must slow down to accommodate the capabilities of the slow memory module.

The reductions in memory system operating frequency result in a corresponding reduction in computer system main memory performance. What is needed is a memory system that operates its controller channel at the highest supported rate while operating all memory devices on the memory modules at their highest supported rates. This capability would maximize the performance of the main memory system.

BRIEF SUMMARY OF THE INVENTION

Exemplary embodiments include a method for deriving clocks in a memory system. The method includes receiving a reference oscillator clock at a hub device. The hub device is in communication with a controller channel via a controller interface and in communication with a memory device via a memory interface. A base clock operating at a base clock frequency is derived from the reference oscillator clock. A memory interface clock is derived by multiplying the base clock by a memory multiplier. A controller interface clock is derived by multiplying the base clock by a controller multiplier. The memory interface clock is applied to the memory interface and the controller interface clock is applied to the controller interface.

Additional exemplary embodiments include a computer program product for deriving clocks in a memory system. The computer program product includes a storage medium readable by a processing circuit and storing instructions for execution by the processing circuit for facilitating a method. The method includes receiving a reference oscillator clock at a hub device. The hub device is in communication with a controller channel via a controller interface and in communication with a memory device via a memory interface. A base clock operating at a base clock frequency is derived from the reference oscillator clock. A memory interface clock is derived by multiplying the base clock by a memory multiplier. A controller interface clock is derived by multiplying the base clock by a controller multiplier. The memory interface clock is applied to the memory interface and the controller interface clock is applied to the controller interface.

Additional exemplary embodiments include a hub device in a memory system. The hub device includes a memory interface, a controller and a clock derivation mechanism. The memory interface is utilized for transmitting and receiving data from a memory device located on a memory module. The transmitting and receiving occur in response to a memory interface clock operating at a memory module clock frequency. The controller interface is utilized for transmitting and receiving data from a controller channel in response to a controller interface clock operating at a controller channel clock frequency. The clock derivation mechanism facilitates: receiving a reference oscillator clock; deriving a base clock operating at a base clock frequency from the reference oscillator clock; deriving the memory interface clock by multiplying the base clock by a memory multiplier; deriving the controller interface clock by multiplying the base clock by a controller multiplier; applying the memory interface clock to the memory interface; and applying the controller interface clock to the controller interface.

Further exemplary embodiments include a memory system. The memory system includes a controller, a controller channel in communication with the controller, one or more memory modules and one or more hub devices. The memory modules each include one or more memory devices. The hub devices buffer addresses, commands and data. Each hub device is in communication with one or more of the memory modules and in communication with the controller via the controller channel. Each of the hub devices are independently configured with a controller channel operating frequency and a memory device operating frequency suing multiples of a base clock derived from a reference oscillator clock. The controller channel operating frequency is utilized for communicating with the controller channel. The memory device operating frequency is utilized for communicating with the memory devices.

BRIEF DESCRIPTION OF THE DRAWINGS

Referring now to the drawings wherein like elements are numbered alike in the several FIGURES:

FIG. 5 depicts an exemplary memory system controller channel with a controller interface forwarded reference clock and independent memory device frequencies using m:n clocking;

FIG. 6 depicts an exemplary memory system controller channel with a separately distributed reference clock and independent memory device frequencies using m:n clocking; and FIG. 7 is a table of sample controller and memory interface data rates with m:n ratios that may be implemented by exemplary embodiments.

DETAILED DESCRIPTION OF THE PREFERRED EMBODIMENTS

Exemplary embodiments pertain to computer memory systems constructed of memory modules interconnected by a controller channel originating from a controller. The memory modules are attached to hub logic devices that are further attached to memory devices on the memory modules. The memory controller channel operates at a common clock frequency. Each memory module receives a common reference oscillator frequency, either by a forwarded controller interface bus clock on the controller channel or by separate reference oscillator input signal. The hub devices are uniquely configured to operate their attached memory devices at operating frequencies that may be non-integer multiples of the reference oscillator frequency. This enables memory modules of varying memory device speed grades to be operated at independent frequencies while residing on a memory controller channel that operates at a common clock frequency.

Figure 1:
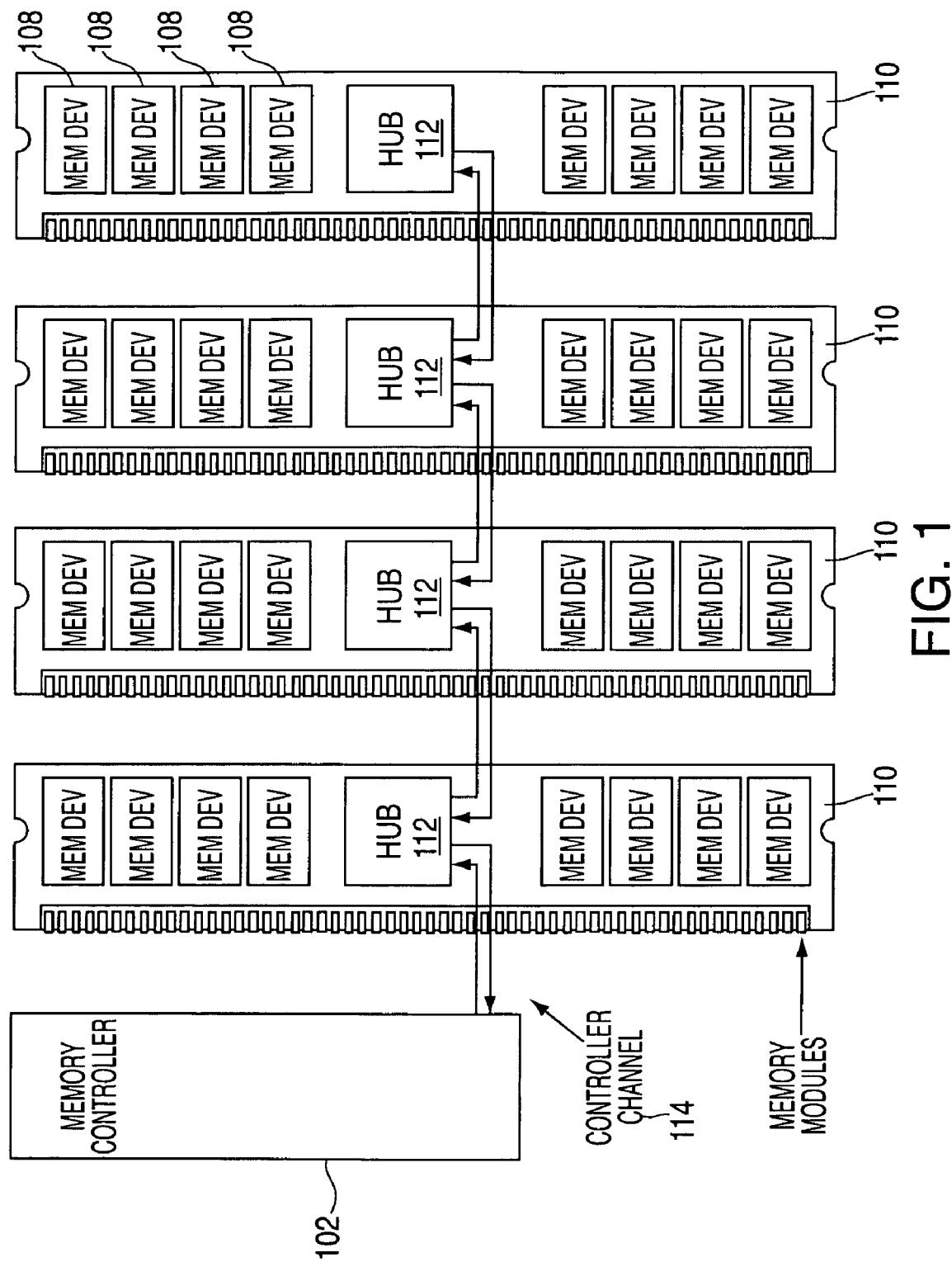
FIG. 1 depicts an exemplary memory system with multiple levels of daisy chained memory modules with point-to-point connections.

Exemplary embodiments include memory systems constructed of one or more memory modules 110 that are connected to a memory controller 102 by a daisy chained controller channel 114 as depicted in FIG. 1. The memory modules 110 contain both a hub device 112 that buffers commands, address and data signals to and from the controller memory channel 114 as well as one or more memory devices 108 connected to the hub device 112. The downstream portion of the controller channel 114 transmits write data and memory operation commands to the hub devices 112. The upstream portion of the controller channel 114 returns requested read data to the controller 102. In exemplary embodiments, each of the hub devices 112 may be independently configured with a controller channel operating frequency and a memory device operating frequency to allow the controller channel 114 to be operating at one frequency and the memory devices 108 to be operated at a different frequency. In addition, each memory module 110 in the memory system and its associated memory devices 108 may be operating at different operating speeds, or frequencies.

Figure 2:
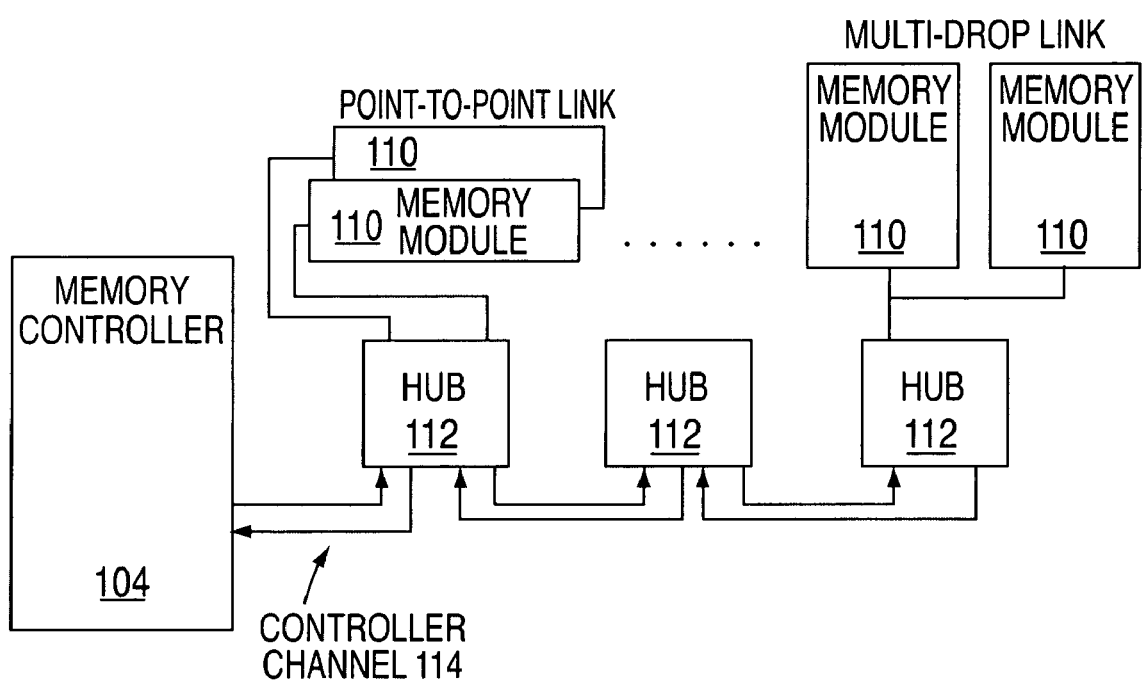
FIG. 2 depicts an exemplary memory system with hub devices that are connected to memory modules and to a controller channel by a daisy chained channel.

FIG. 2 depicts an alternate exemplary embodiment that includes a memory system constructed of one or more memory modules 110 connected to hub devices 112 that are further connected to a memory controller 102 by a daisy chained controller channel 114. In this embodiment, the hub device 112 is not located on the memory module 110; instead the hub device 112 is in communication with the memory module 110. The controller channel 114 may be constructed using multi-drop connections to the hub devices 112 or by using point-to-point connections. As depicted in FIG. 2, the memory modules 110 may be in communication with the hub devices 112 via multi-drop connections and/or point-to-point connections. Other hardware configurations are possible, for example exemplary embodiments may utilize only a single level of daisy chained hub devices 112 and/or memory modules 110.

Figure 3:
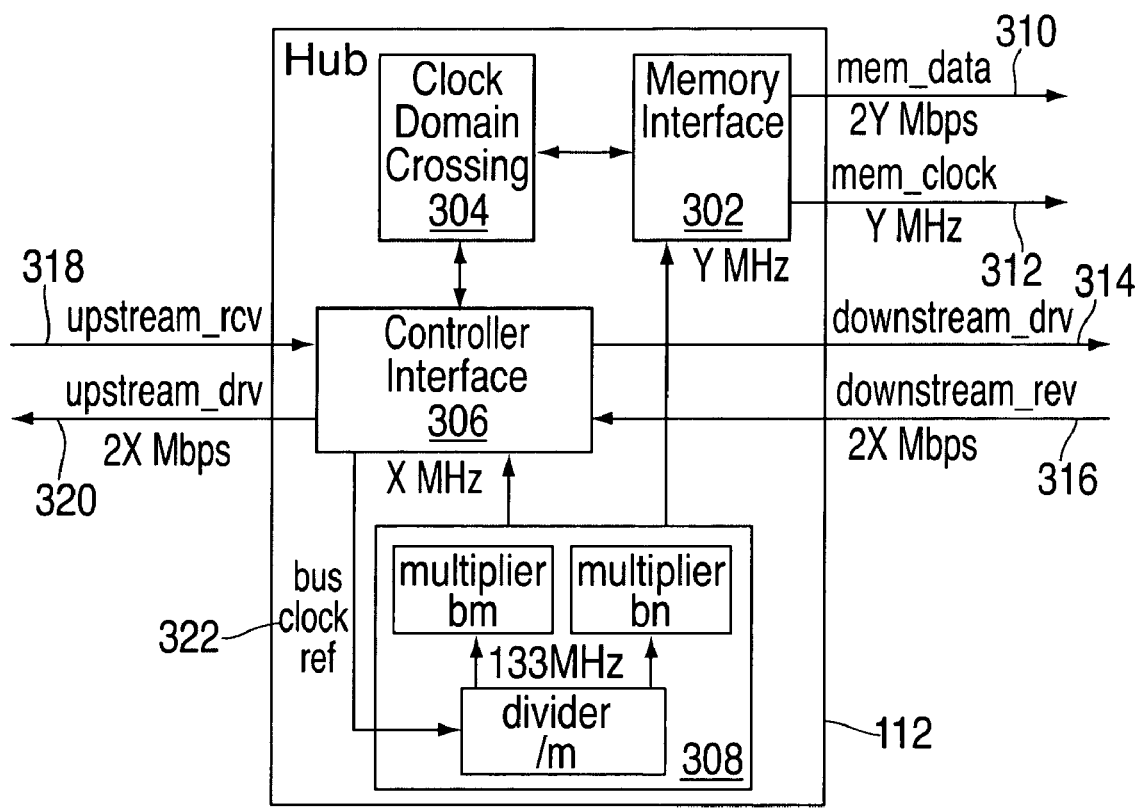
FIG. 3 depicts an exemplary hub device using m:n clocking with a forwarded controller interface bus clock reference.

FIG. 3 depicts an exemplary hub device 112 using m:n clocking with a forwarded controller interface bus clock reference 322 as the reference oscillator clock. The hub device 112 includes a clock domain crossing function 304, a memory interface 302, a controller interface 306, and a phased lock loop (PLL) 308 (also referred to herein as a clock derivation mechanism because it may be implemented in other manners including software and/or hardware). The memory interface 302 sends data to and receives data from memory devices 108 on the memory module 110 via a mem_data bus 310 operating at '2*Y' Mbps and clocked by a memory_clock 312 with a frequency of 'Y' MHz. The controller interface 306 communicates with downstream memory modules 110 via a downstream_drv 314 (to drive data and commands downstream) and a downstream_rcv 316 (to receive data). In addition, the controller interface 306 communicates with upstream memory modules 110 or the controller 102 (if there are no upstream memory modules 110) 110 via an upstream_rcv 318 (to receive data and commands) and an upstream_drv 320 (to drive data and commands upstream).

Exemplary embodiments of the present invention use two configurable integer ratios, named 'm' and 'n', within the hub device 112 to allow each memory module 110 within the controller channel 114 to operate at a common channel frequency (also referred to herein as a controller channel clock frequency) but with a unique memory device frequency (also referred to herein as a memory module clock frequency). 'm', a controller multiplier, is defined as the ratio of controller channel frequency, 'X' to a small, fixed, base clock frequency such as, but not limited to 133 MHz, 100 MHz, 66 MHz, etc. Hub devices 112 that use the clock forwarded on the controller channel 114 as their internal reference clock will divide the frequency of the forwarded controller interface bus clock reference 322 by 'm' to create, for example, a 133 MHz base clock. If the intended controller interface frequency is not evenly divisible by the base clock frequency, then the controller interface frequency is derived by rounding down to the next integer multiple of the frequency of the base clock ('b'). This base clock will be used as the reference oscillator clock and input to a PLL 308 where it will be multiplied by 'm' to produce a cleaned up and distributed version of the controller interface clock. 'n', the memory multiplier, is defined as the ratio of the memory device clock frequency to the base frequency (e.g., 133 MHz). Hub devices 112 multiply the 133 MHz base clock by 'n' in their PLL 308 to produce the cleaned up memory interface clock running at 'Y' MHz. The resulting controller channel frequency to memory device operating frequency ratio is 'm:n'.

Because the ratio of controller interface to memory interface operating frequency is known by the hub device 112, a simplified clock domain crossing function 304 is employed in the hub device 112 to transfer controller interface information to and from the memory interface 302. If the controller interface 306 and/or memory interface 302 operate using double data rate (DDR) clocking, the data rates (in Mbps) will be twice the respective interface clock frequency, (i.e., 2X and/or 2Y). If DDR is used on both interfaces, the ratio of the data rates will also be 'm:n'.

Figure 4:
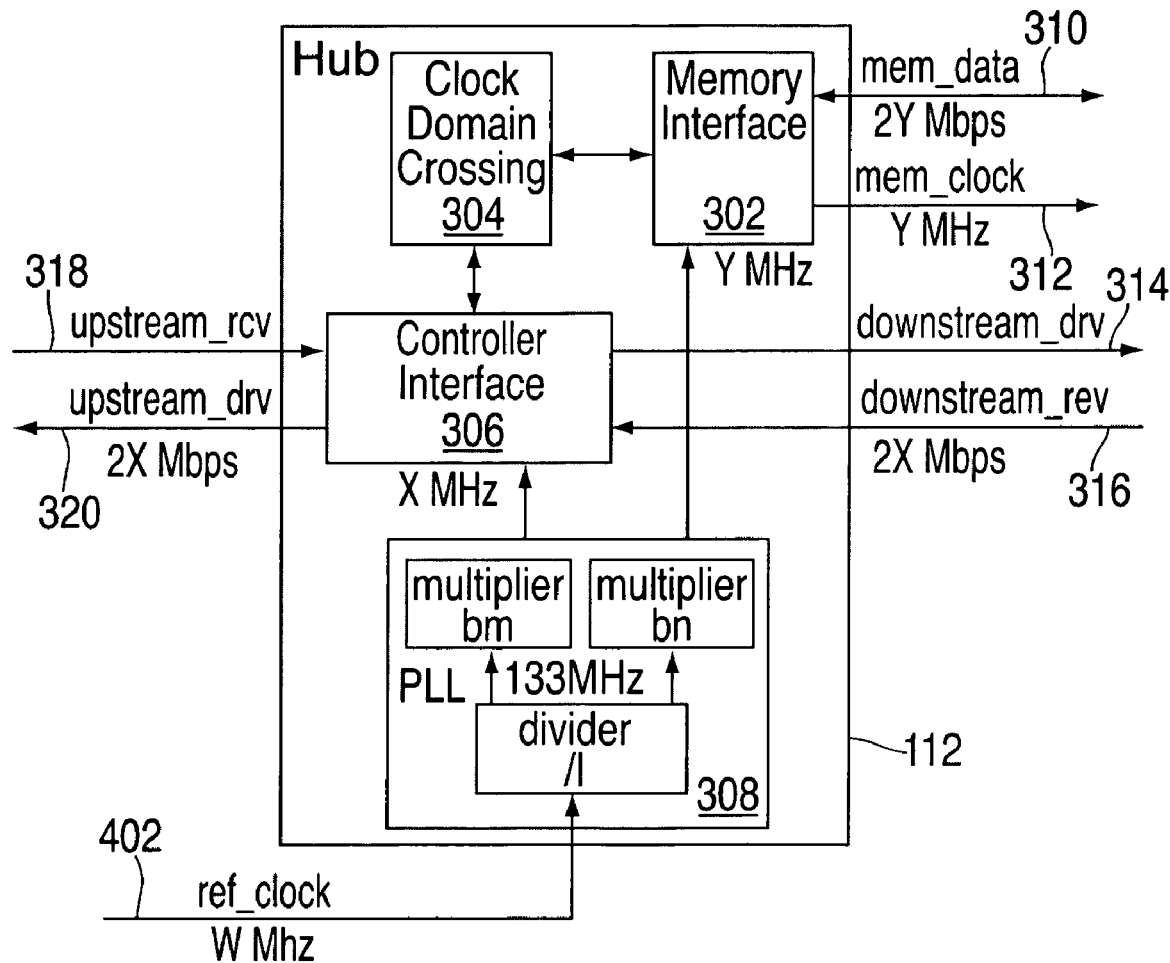
FIG. 4 depicts an exemplary hub device using m:n clocking with a separately distributed clock reference.

FIG. 4 depicts an exemplary hub device using m:n clocking with a separately distributed reference clock 402 input to the PLL 308 as the reference oscillator clock. Main memory systems that use a separately distributed reference clock 402 can also use 'm:n' clocking. In this case, the frequency of the incoming reference clock 402 must be an integer multiple of the frequency of the base clock (e.g., 133 MHz). The reference clock 402 operating at a frequency of 'W' MHz is divided by an integer 'L' to produce the 133 MHz base clock that is used as the input clock to the multipliers in the PLL 308. If the separately distributed reference clock 402 has a frequency that is equal to 133 MHz, then 'L' is simply one. The PLL 308 multiplies the base clock by 'm' to produce the cleaned up controller interface clock whose frequency is 'X'. The PLL 308 also multiplies the base clock by 'n' to produce the memory interface clock whose frequency is 'Y'. A simplified clock domain crossing function 304 is used to transfer information between the logic in the controller interface 306 and the memory interface 302.

FIG. 5 depicts an exemplary memory system controller channel 114 with a controller interface forwarded reference clock 322 and independent memory device frequencies using m:n clocking. Memory systems that use 'm:n' clocking are able to operate their memory modules 110 at uniquely configured memory interface frequencies equal to the highest frequency supported by their memory devices 108. FIG. 5 shows a single channel of a memory system in which the memory module labeled DIMM 0 502 is configured to operate its memory devices 108 at the 'Y0' frequency while the memory module labeled DIMM 1 504 is configured to operate its memory devices 108 at the 'Y1' frequency. Both DIMM 0 502 and DIMM 1 504 operate at a common, 'X' controller interface frequency. FIG. 6 depicts an exemplary memory system channel with a separately distributed reference clock 402 and independent memory device frequencies using m:n clocking to maximize frequencies and performance.

If the memory channel frequency, 'X' is limited by its electrical and/or timing requirements in a particular system, the memory device frequencies can still be maximized through the use of m:n clocking. This maximization of operating frequencies results in an optimization of memory channel, and therefore computer system, performance.

When configuring a memory system for optimum performance using m:n clocking, users should first evaluate the highest supported controller channel frequency. This is rounded down to the next integer multiple of the base clock frequency, (e.g., 133 MHz) and yields 'X'. 'X' is divided by the base clock frequency to determine 'm' for all hub devices 112 in the controller channel 114. For each memory module 110 in the controller channel 114, users should evaluate the highest supported memory device operating frequency. This will be a function of hub device 112 and memory device 108 specifications along with the results of electrical analysis of the memory interface 302 on the memory module 110 itself. This maximum operating frequency should be rounded down to the next integer multiple of the base clock frequency, yielding 'Y' for that memory module 110. 'Y' is divided by the base clock frequency to determine 'n' for that particular memory module 110 and/or hub device 112.

FIG. 7 is a table of sample controller and memory interface data rates with m:n ratios that may be implemented by exemplary embodiments. Memory systems using m:n clocking are highly flexible and can be greatly optimized. The following table shows various m and n values, data rates and m:n ratios for a base clock frequency of 133 MHz. Some interesting integer m:n ratios are highlighted with a '*' to illustrate settings that can be used to recreate the more typical, fixed data rate ratios at various controller channel and memory device operating frequencies.

Exemplary embodiments may be utilized to maximize the performance of a memory system by operating the controller channel at its highest supported rate while at the same time operating all memory devices on the memory modules at their highest supported frequencies. The frequencies of the memory devices on each memory module connected to the controller channel can be different for each memory module, allowing memory devices of varying speeds to be optimized on the same controller channel.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for deriving clocks in a memory system, the method comprising:
    receiving a reference oscillator clock at a hub device, the hub device in communication with a controller channel via a controller interface and the hub device in communication with a memory device via a memory interface;
    deriving a base clock from the reference oscillator clock, the base clock operating at a base clock frequency;
    deriving a memory interface clock by multiplying the base clock by a memory multiplier;
    deriving a controller interface clock by multiplying the base clock by a controller multiplier;
    applying the memory interface clock to the memory interface; and
    applying the controller interface clock to the controller interface, wherein controller interface information is transferred via a clock domain crossing function between the controller interface operating at a controller channel clock frequency and the memory interface operating at a memory module clock frequency, and further wherein the controller channel clock frequency is greater than the memory module clock frequency.

2. The method of claim 1 wherein the reference oscillator clock is derived from a forwarded controller interface bus clock at the controller channel clock frequency that is an integer multiple of the base clock frequency.

3. The method of claim 2 wherein the controller channel clock frequency is determined by rounding a maximum controller channel clock frequency down to a next integer multiple of the base clock frequency.

4. The method of claim 1 wherein the reference oscillator clock is derived from a separately distributed reference clock with a frequency that is an integer multiple of the base clock frequency.

5. The method of claim 4 wherein the base clock is derived by dividing the frequency of the reference oscillator clock by the integer multiple.

6. The method of claim 1 further comprising:
receiving the reference oscillator clock at a second hub device, the second hub device in communication with the controller channel via a second controller interface and the second hub device in communication with a second memory device via a second memory interface;
deriving a second memory interface clock by multiplying the base clock by a second memory multiplier; and
applying the second memory interface clock to the second memory interface.

7. The method of claim 6 wherein the second memory multiplier is different from the memory multiplier.

8. The method of claim 1 further comprising:
deriving a second controller interface clock by multiplying the base clock by a second controller multiplier; and
applying the second controller interface clock to a second controller interface.

9. The method of claim 1 wherein the controller channel clock frequency is a non-integer multiple of the memory module clock frequency.

10. The method of claim 1 wherein the memory multiplier is calculated by dividing a maximum memory module clock frequency by the base clock frequency and rounding down to the nearest integer.

11. The method of claim 10 wherein the memory module clock frequency is a maximum operating frequency of a memory module accessed by the memory interface.

12. The method of claim 1 wherein the controller multiplier is calculated by dividing a maximum controller channel clock frequency by the base clock frequency and rounding down to the nearest integer.

13. The method of claim 12 wherein the controller channel clock frequency is a maximum operating frequency of the controller channel accessed.

14. The method of claim 1 wherein the base clock frequency is one hundred and thirty three megahertz.

15. The method of claim 1 wherein the memory multiplier is different from the controller multiplier.

* * * * *